(12) United States Patent
Charopoulos et al.

(10) Patent No.: US 11,603,074 B1
(45) Date of Patent: Mar. 14, 2023

(54) SAFETY BELT POSITIONING AND PRESENTATION SYSTEMS

(71) Applicants: Philipp Charopoulos, Mettman (DE); Lukas Satas, San Jose, CA (US); John J. Baker, Campbell, CA (US); Jonathon R. Folks, Cupertino, CA (US); Andrew W. Kooker, San Francisco, CA (US)

(72) Inventors: Philipp Charopoulos, Mettman (DE); Lukas Satas, San Jose, CA (US); John J. Baker, Campbell, CA (US); Jonathon R. Folks, Cupertino, CA (US); Andrew W. Kooker, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/863,452

(22) Filed: Jul. 13, 2022

Related U.S. Application Data

(63) Continuation of application No. 17/123,498, filed on Dec. 16, 2020, now Pat. No. 11,414,046, which is a
(Continued)

(51) Int. Cl.
*B60R 22/00* (2006.01)
*B60R 22/20* (2006.01)
(Continued)

(52) U.S. Cl.
CPC ............ *B60R 22/201* (2013.01); *B60N 2/688* (2013.01); *B60R 22/023* (2013.01); *B60R 22/20* (2013.01); *B60R 22/26* (2013.01); *B60R 2022/1806* (2013.01); *B60R 2022/1818* (2013.01); *B60R 2022/207* (2013.01); *B60R 2022/208* (2013.01); *B60R 2022/266* (2013.01)

(58) Field of Classification Search
CPC ..... B60R 22/201; B60R 22/023; B60R 22/20; B60R 22/26; B60R 22/03; B60R 2022/1818; B60R 2022/207; B60R 2022/208; B60R 2022/266; B60R 2022/1806; B60R 2022/021; B60N 2/688
USPC ...................................... 280/804, 801.1, 808
See application file for complete search history.

(56) References Cited

U.S. PATENT DOCUMENTS 4,765,651 A 8/1988 Unger
5,022,677 A 6/1991 Barbiero
(Continued)

FOREIGN PATENT DOCUMENTS

JP S63247148 A * 10/1988

*Primary Examiner* — Keith J Frisby
(74) *Attorney, Agent, or Firm* — Young Basile Hanlon & MacFarlane, P.C.

(57) ABSTRACT

A safety belt presentation system includes a safety belt presentation track extending from a first position to a second position spaced from the first position, a latch that includes a tongue disposed between a first side of the latch and second side of the latch and a first coupling portion, and a driving mechanism that includes a second coupling portion configured to releasably couple the first coupling portion of the latch. The driving mechanism is configured to control the latch to move from the first position to the second position along the safety belt presentation track when the first and second coupling portions are coupled.

20 Claims, 12 Drawing Sheets

Related U.S. Application Data continuation of application No. 16/109,902, filed on Aug. 23, 2018, now Pat. No. 10,889,261.

(60) Provisional application No. 62/560,281, filed on Sep. 19, 2017.

(51) Int. Cl.
*B60R 22/02* (2006.01)
*B60N 2/68* (2006.01)
*B60R 22/26* (2006.01)
*B60R 22/18* (2006.01)

(56) References Cited

U.S. PATENT DOCUMENTS

| | | |
|---|---|---|
| 5,505,491 A | 4/1996 | Townsend |
| 5,538,283 A | 7/1996 | Townsend |
| 5,806,891 A | 9/1998 | Pokhis |
| 6,116,696 A | 9/2000 | Widman et al. |
| 6,154,353 A | 11/2000 | Bowers et al. |
| 6,308,986 B1 | 10/2001 | Townsend et al. |
| 7,178,208 B2 | 2/2007 | Bentsen et al. |
| 9,637,083 B2 | 5/2017 | Schlittenbauer et al. |
| 10,124,898 B2 | 11/2018 | Herrmann |
| 2002/0089164 A1 | 7/2002 | Rouhana et al. |
| 2013/0009391 A1 | 1/2013 | Miller et al. |
| 2014/0285930 A1 | 9/2014 | Powell |
| 2016/0344312 A1 | 11/2016 | Trangbaek et al. |
| 2017/0278613 A1 | 9/2017 | Powell et al. |

\* cited by examiner

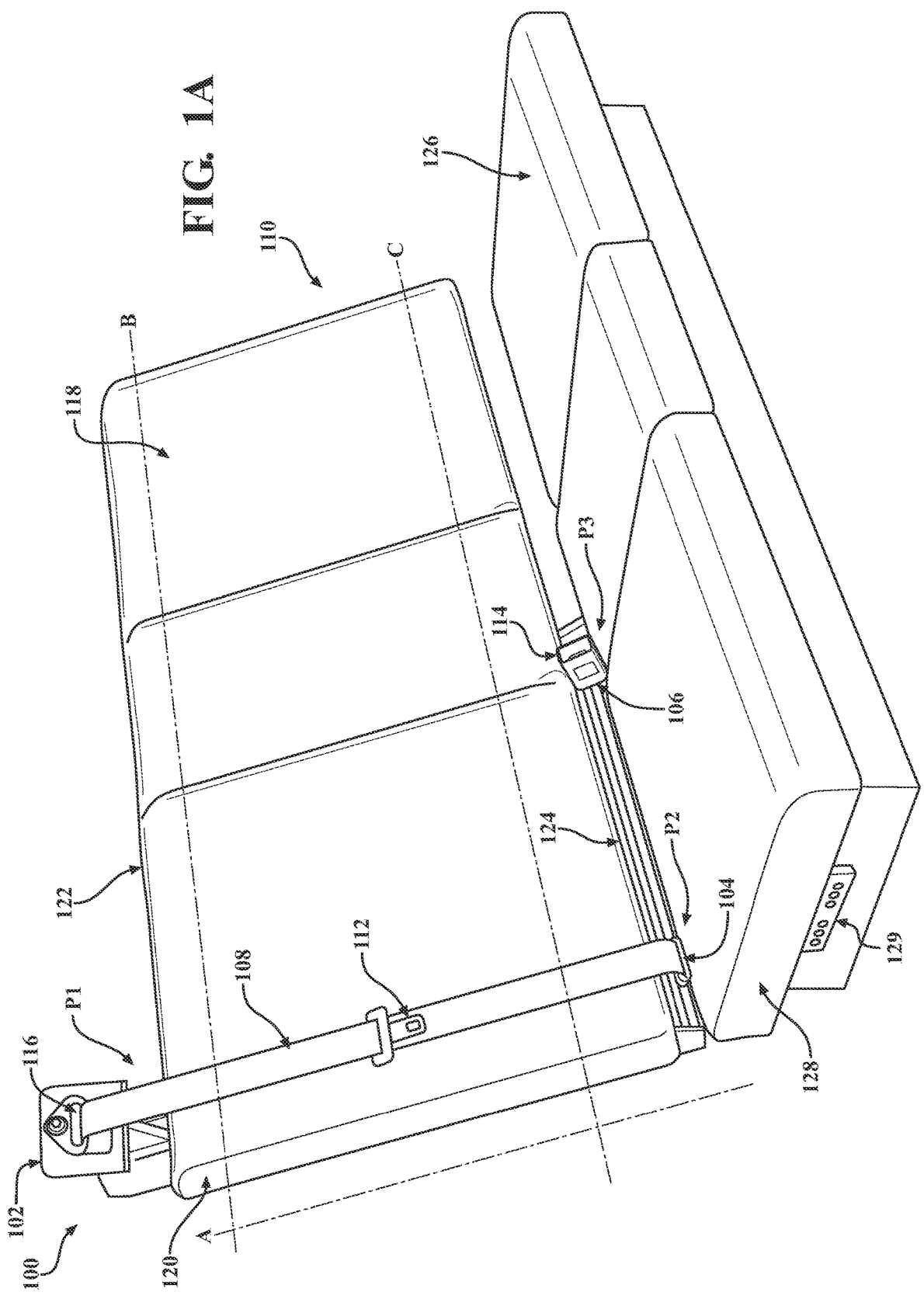

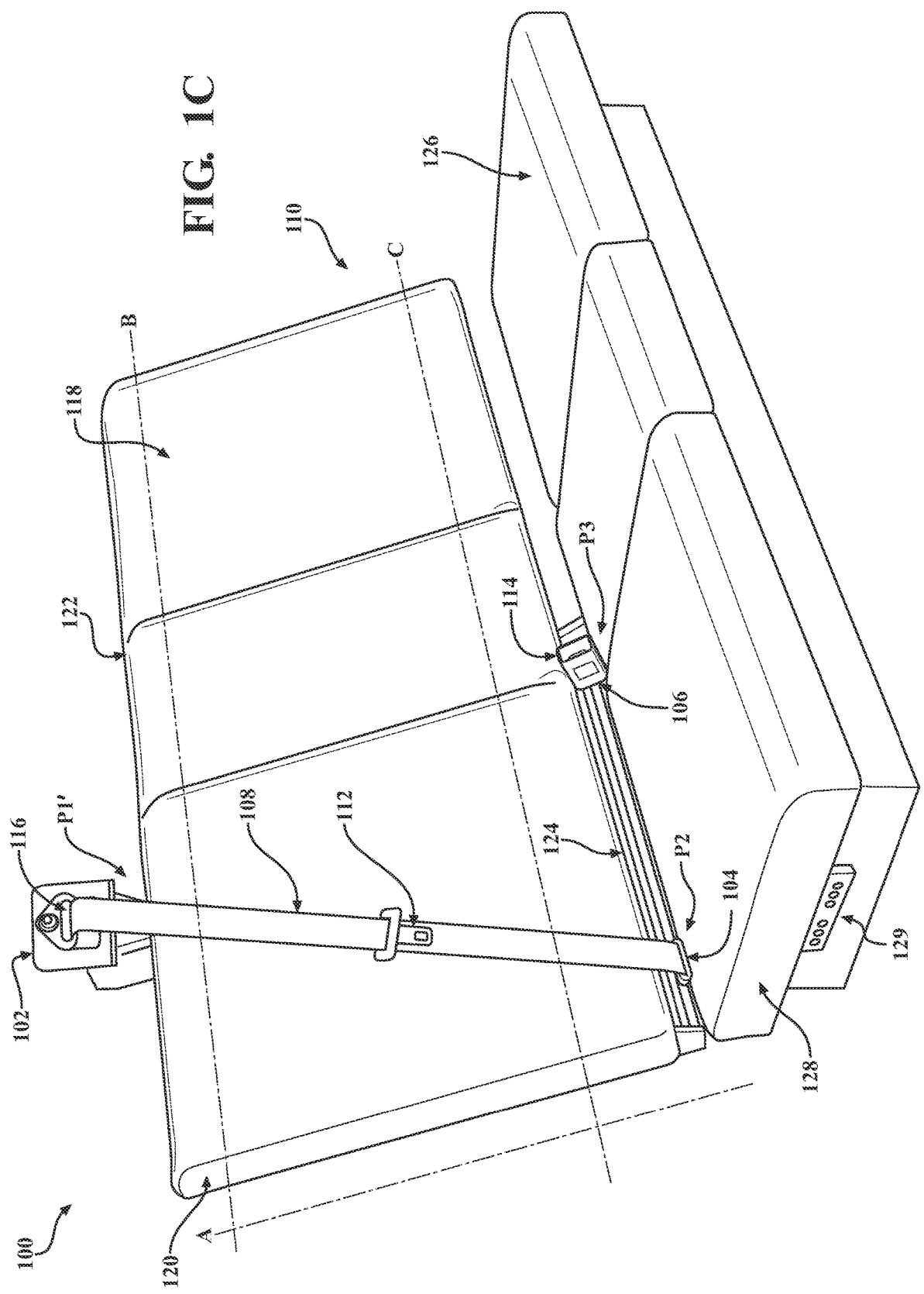

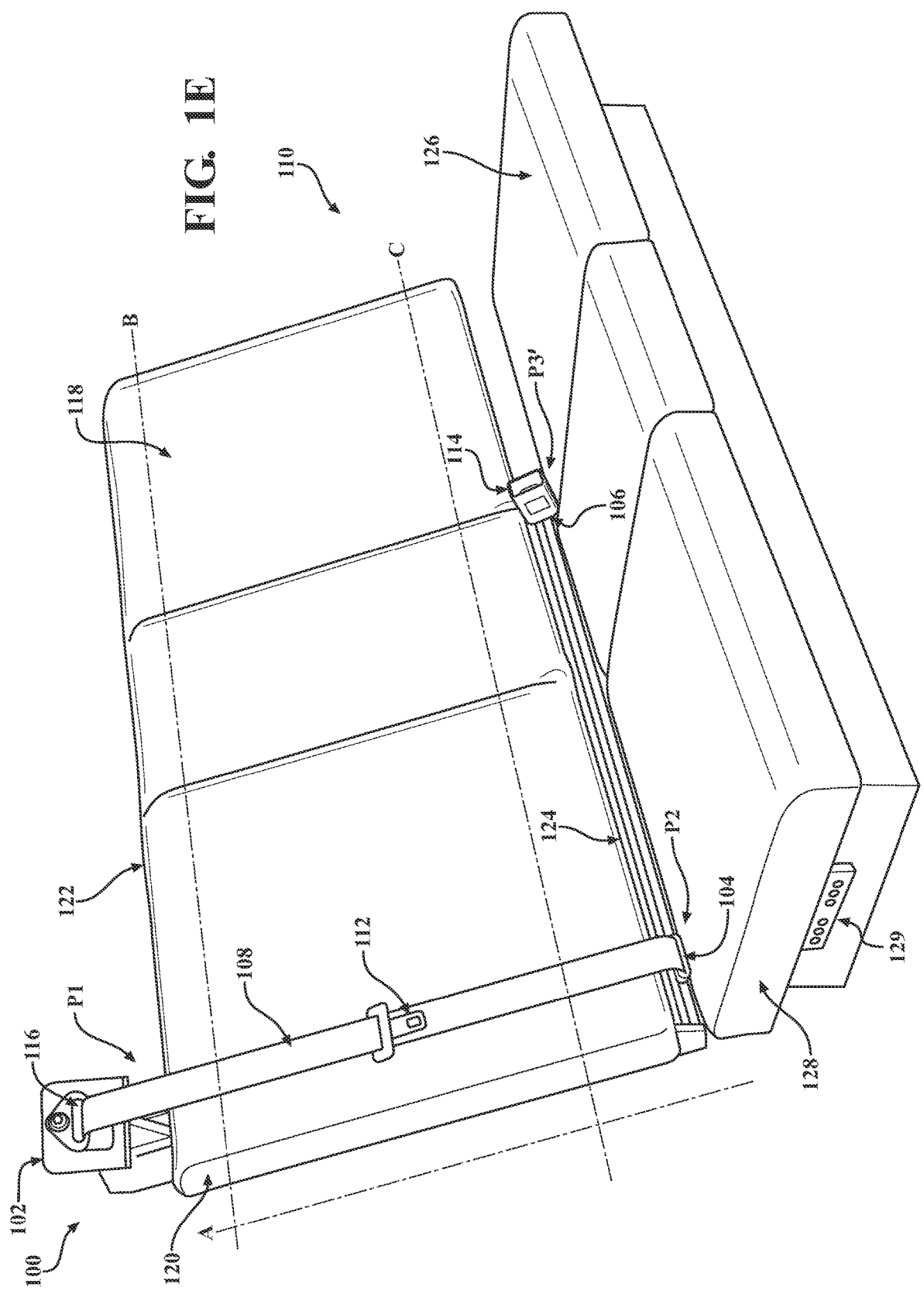

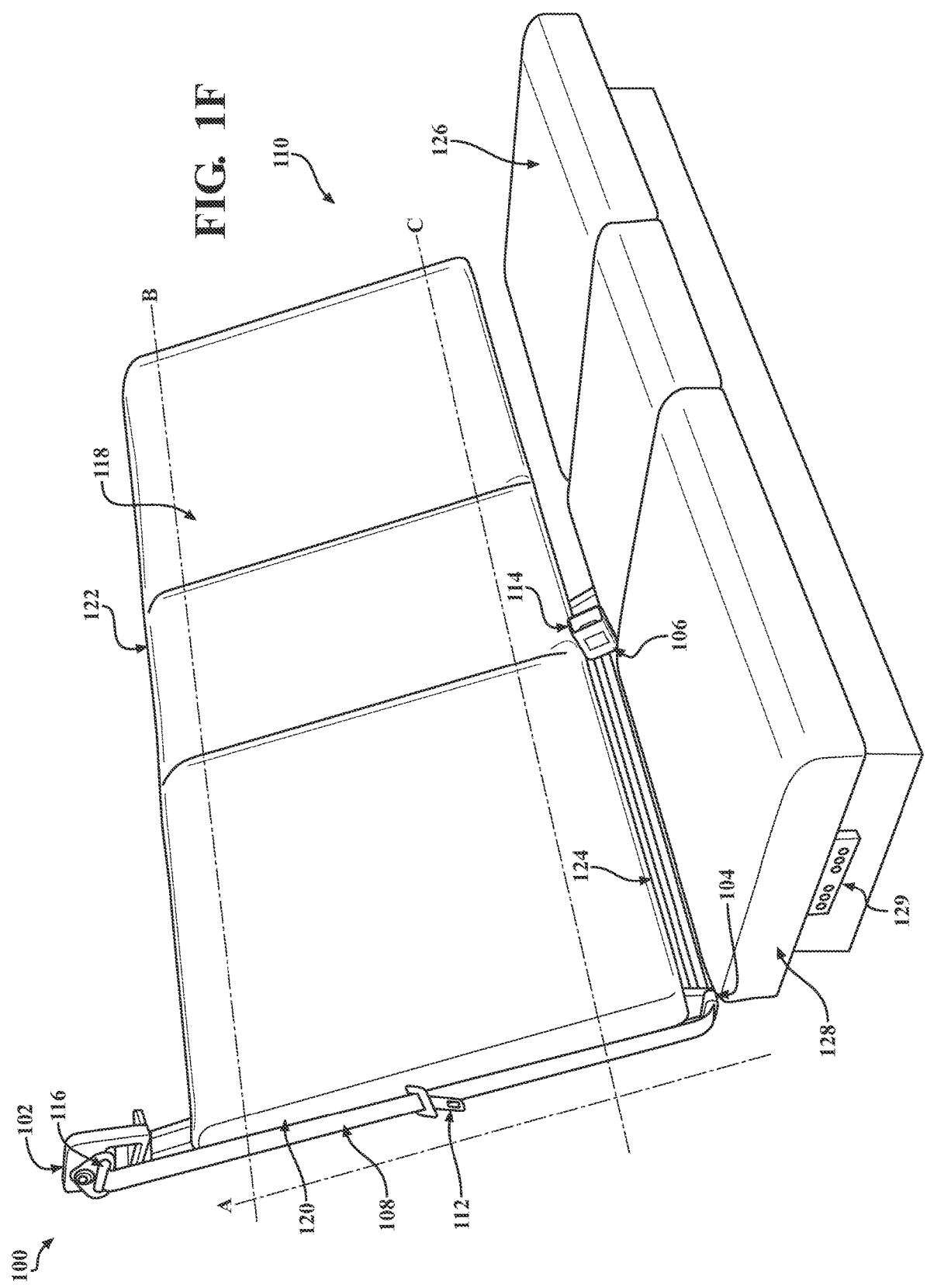

SAFETY BELT POSITIONING AND PRESENTATION SYSTEMS

CROSS-REFERENCE TO RELATED APPLICATIONS

This application is a continuation of U.S. patent application Ser. No. 17/123,498, filed on Dec. 16, 2020, which is a continuation of U.S. patent application Ser. No. 16/109,902, filed on Aug. 23, 2018, which claims priority to U.S. Provisional Application Ser. No. 62/560,281, filed on Sep. 19, 2017, the contents of which are incorporated herein by reference.

FIELD

The application relates generally to safety belt systems for vehicles. More particularly, described embodiments relate to safety belt positioning and presentation systems.

BACKGROUND

Existing occupant safety systems for traditional, one- two- or three-row vehicles, such as restraints including safety belts, can reduce the risk of injury during a collision. Safety belts typically include a strap, such as a shoulder strap or a lap strap, and a buckle. The buckle typically includes a latch and a receiver. An occupant of a vehicle may sit in a vehicle seat and reach for the latch. The occupant may then pull on the latch to draw a portion of the strap away from the vehicle seat so that the occupant can insert the latch into the receiver, thereby, securing the strap around the occupant's body.

Safety belts typically include one or more anchors that secure the safety belts to the vehicle seat and that provide directional guidance for positioning the strap on the occupant's body as the latch is inserted into the receiver. The one or more anchors are typically stationary and disposed at predetermined positions on the vehicle seat. Accordingly, if the safety belt secures the occupant to the vehicle seat in an undesirable manner, the occupant cannot adjust the location or position of the one or more anchors in order to adjust how the strap is positioned on the occupant's body. Additionally, it may be difficult to locate the latch. For example, the latch may become lodged between portions of the vehicle seat and may be difficult to locate or retrieve in order to operate the safety belt. Accordingly, new approaches to safety belt positioning and presentation systems are desirable.

SUMMARY

One aspect of the disclosed embodiments a safety belt positioning system that includes a first anchor that is disposed adjacent an upper portion of a seat back and that is selectively positionable between a first position on a first axis and a second position along the first axis. The system further includes a second anchor disposed adjacent a lower portion of the seat back. The second anchor is selectively coupled to the first anchor. The system further includes a third anchor disposed adjacent the lower portion of the seat back, the third anchor being selectively coupled to the second anchor and separated by a distance on a second axis from the second anchor. The first anchor, the second anchor, and the third anchor are jointly positionable when the second anchor is coupled to the first anchor and when the third anchor is coupled to the second anchor.

Another aspect of the disclosed embodiments is a safety belt presentation system that includes a buckle portion that includes a tongue disposed between a first side of the buckle portion and a second side of the buckle portion. The first buckle portion further includes a strap control mechanism disposed between the first side of the first buckle portion and the second side of the buckle portion. The strap control mechanism controls movement of at least a portion of a shoulder strap. The buckle portion further includes a first coupling portion coupling the buckle portion to a safety belt presentation track. The system further includes a driving mechanism adapted to traverse the safety belt presentation track. The driving mechanism includes a second coupling portion engaging the first coupling portion. The buckle portion moves from a first position to a second position in response to the driving mechanism traversing the safety belt presentation track.

Another aspect of the disclosed embodiments is a system that includes a first anchor that is disposed adjacent an upper portion of a seat back and that is selectively positionable between a first position on a first axis and a second position along the first axis. The system further includes a second anchor disposed adjacent a lower portion of the seat back. The second anchor is selectively coupled to the first anchor. The system further includes a third anchor disposed adjacent the lower portion of the seat back, the third anchor being selectively coupled to the second anchor and that is separated by a distance on a second axis from the second anchor. The system further includes a buckle portion that includes a tongue disposed between a first side of the buckle portion and a second side of the buckle portion. The buckle portion further includes a first coupling portion coupling the buckle portion to safety belt presentation track. The system further includes a driving mechanism adapted to traverse the safety belt presentation track. The driving mechanism includes a second coupling portion engaging the first coupling portion. The buckle portion moves from a first position to a second position in response to the driving mechanism traversing the safety belt presentation track. The first anchor, the second anchor, and the third anchor are jointly positionable when the second anchor is coupled to the first anchor and when the third anchor is coupled to the second anchor.

BRIEF DESCRIPTION OF THE DRAWINGS

FIGS. 1A-1F generally illustrate a motion diagram of a safety belt positioning system according to the principles of the present disclosure.

DETAILED DESCRIPTION

Figure 1B:
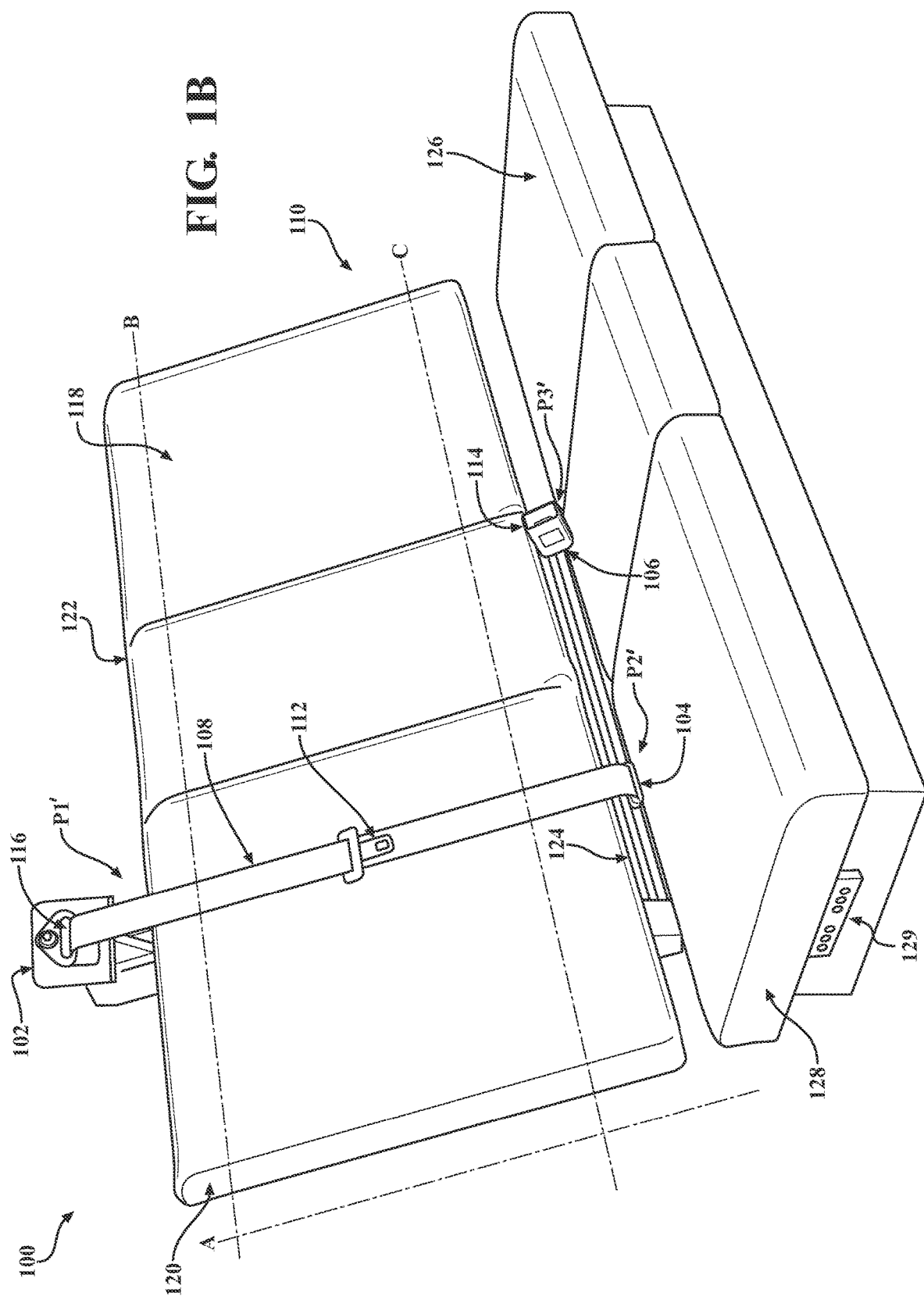

This disclosure relates to advances in safety belt positioning and presentation systems suitable for use in vehicles. Improved safety belt positioning and presentation systems include selectively positionable safety belt anchors and a safety belt presenter. The safety belt anchors are selectively positionable vertically and horizontally relative to a seat back of a vehicle seat. Additionally, or alternatively, the safety belt anchors are jointly positionable and independently positionable with respect to one another. The use of these features allows for an occupant of the vehicle to adjust a position of a safety belt strap such that the safety belt strap is desirably positioned on the occupant's body when the safety belt is in operation. The safety belt presenter is adapted to retain a safety belt latch and to transition the safety belt latch from a first position to a second position such that the safety belt latch is presented to the occupant of the vehicle for use in operating the safety belt. The use of these features allows for an occupant of the vehicle to adjust a position of a safety belt strap such that the safety belt strap is desirably positioned on the occupant's body when the safety belt is in operation and to consistently and easily locate the safety belt latch for use in operating the safety belt.

FIGS. 1A-1F generally illustrate a motion diagram of a safety belt positioning system 100 according to the principles of the present disclosure. The safety belt positioning system 100 may be disposed within a vehicle (not shown). The safety belt positioning system 100 may include a first or shoulder anchor 102, a second or lap anchor 104, and a third or buckle anchor 106. The shoulder anchor 102, the lap anchor 104, and the buckle anchor 106 cooperatively operate to anchor a safety belt strap 108 (which may be referred to as a shoulder strap) to a vehicle seat 110 within the vehicle. Additionally, or alternatively, the shoulder anchor 102 and the lap anchor 104 cooperatively operate to guide the safety belt strap 108 as the safety belt strap 108 is drawn away from the vehicle seat 110 by an occupant of the vehicle and positioned on the occupant's body as the occupant operates the safety belt positioning system 100.

The safety belt positioning system 100 includes a buckle that comprises a first buckle portion or a safety belt latch 112 and second buckle portion or a safety belt receiver 114. The safety belt receiver 114 is coupled or attached to a portion of the buckle anchor 106. The safety belt latch 112 is adapted to be inserted into the safety belt receiver 114. The occupant may engage the safety belt latch 112 by gripping a portion of the safety belt latch 112. The occupant may move the safety belt latch 112 toward the safety belt receiver 114. As the safety belt latch 112 is moved toward the safety belt receiver 114, a portion of the safety belt strap 108 is drawn from an aperture 116 of the shoulder anchor 102 as the safety belt strap 108 is released from a safety belt retainer (not shown) disposed on or near the shoulder anchor 102.

The occupant may then insert the safety belt latch 112 into the safety belt receiver 114. The safety belt receiver 114 is adapted to retain the safety belt latch 112 and to secure the safety belt latch 112 within the safety belt receiver 114. As the safety belt latch 112 is inserted into the safety belt receiver 114, the safety belt strap 108 is positioned on the occupant's body. When the safety belt strap 108 is positioned on the occupant's body and the safety belt latch 112 is secured within the safety belt receiver 114, the safety belt strap 108 acts as a restraint while the occupant is in the vehicle.

In some embodiments, the shoulder anchor 102 is disposed on, near, or is otherwise adjacent an upper portion 122 of a seat back 118 of the vehicle seat 110. The shoulder anchor 102 may be coupled or attached to a bracket disposed on a rear side of the seat back 118. As described, the shoulder anchor 102 is adapted to anchor a portion of the safety belt strap 108 to the vehicle seat 110 and to guide a portion of the safety belt strap 108 as the safety belt strap 108 is positioned on the occupant's body.

In some embodiments, the shoulder anchor 102 is selectively positionable along a first axis A. The first axis A may include a vertical axis, an axis that is parallel or substantially parallel to a side 120 of the seat back 118, or another suitable axis. The shoulder anchor 102 may be selectively positionable between a first position and a second position along the first axis A. For example, the first position may be located at or near the seat back 118 and the second position may be located at a distance above the seat back 118 along the first axis A. The shoulder anchor 102 is adapted to be positionable at any suitable position between the first position and the second position along the first axis A.

In some embodiments, the shoulder anchor 102 is selectively positionable along a second axis B in either or both of a first direction and a second direction along the second axis B. The second axis B may include a horizontal axis, an axis that is parallel or substantially parallel to the upper portion 122 of the seat back 118, or another suitable axis. In some embodiments, the second axis B is perpendicular or substantially perpendicular to the first axis A. The shoulder anchor 102 may be selectively positionable between a first position and a second position along the second axis B. For example, the first position may be located at or near the seat back 118, as described above. The second position may be located at a distance in the first direction or the second direction along the second axis B away from the first position. The shoulder anchor 102 is adapted to be positionable at any suitable position between the first position and the second position along the second axis B.

In some embodiments, the lap anchor 104 is disposed between a lower portion 124 of the seat back 118 and a seat bottom 126 at a location along the second axis B. The lap anchor 104 is coupled or attached to a bracket disposed on the rear side of the seat back 118. As described, the lap anchor 104 is adapted to anchor a portion of the safety belt strap 108 to the vehicle seat 110 and to guide a portion of the safety belt strap 108 as the safety belt strap 108 is positioned on the occupant's body.

In some embodiments, the lap anchor 104 is selectively positionable along a third axis C in either or both of a first direction and a second direction along the third axis C. The third axis C may include a horizontal axis, an axis that is parallel or substantially parallel to a lower portion 124 of the seat back 118, or another suitable axis. In some embodiments, the third axis C is perpendicular or substantially perpendicular to the first axis A and parallel or substantially parallel to the second axis B.

The lap anchor 104 may be selectively positionable between a first position and a second position along the third axis C. The first position may be located along the third axis C at or near a first side 128 of the seat bottom 126, as is generally illustrated. However, the first position may be located at any suitable location along the third axis C. The second position may be located at a distance in the first direction or the second direction along the third axis C away from the first position. The lap anchor 104 is adapted to be positionable at any suitable position between the first position and the second position along the third axis C.

In some embodiments, the buckle anchor 106 is disposed between the lower portion 124 of the seat back 118 and a seat bottom 126 at a location along the third axis C. The buckle anchor 106 is disposed along the third axis C at a distance from the lap anchor 104. The buckle anchor 106 is coupled or attached to a bracket disposed on the rear side of the seat back 118. As described above, the safety belt receiver 114 is coupled or attached to the buckle anchor 106. The buckle anchor 106 is adapted to anchor the safety belt receiver 114 to the vehicle seat 110 and to anchor the safety belt strap 108 to the vehicle seat 110 when the safety belt latch 112 is inserted into the safety belt receiver 114.

In some embodiments, the buckle anchor 106 is selectively positionable along the third axis C in either or both of the first direction and the second direction. For example, the buckle anchor 106 may be selectively positionable between a third position and a fourth position along the third axis C. The third position may be located along the third axis C at a distance from the lap anchor 104 in either the first direction or the second direction. The fourth position may be located at a distance in the first direction or the second direction along the third axis C between the third position and the lap anchor 104. The buckle anchor 106 is adapted to be positionable at any suitable position between the third position and the fourth position along the third axis C.

Figure 2:
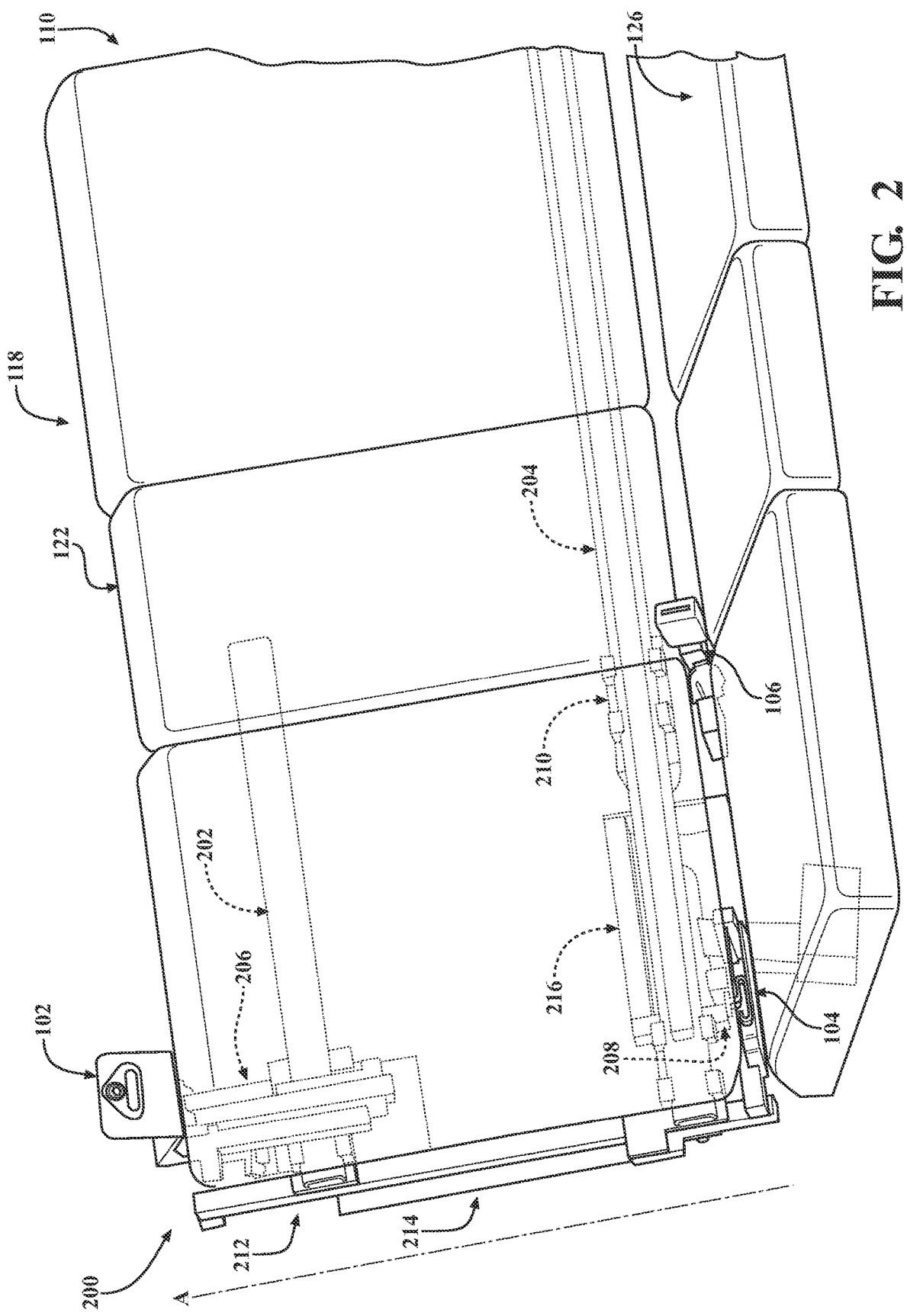
FIG. 2 generally illustrates a rear view of the safety belt positioning system of FIGS. 1A-1F.

In some embodiments, the shoulder anchor 102, the lap anchor 104, and/or the buckle anchor 106 are jointly and/or independently positionable along the second axis B and the third axis C, respectively. The shoulder anchor 102 may be selectively mechanically coupled to and decoupled from the lap anchor 104. The lap anchor 104 may be selectively mechanically coupled to and decoupled from the buckle anchor 106. For example, the safety belt positioning system 100 may include a support structure disposed on the rear side of the vehicle seat 110. An example of a support structure is generally illustrated in FIG. 2 and is be described in detail below. The support structure may include a plurality of rails, brackets, latches, levers, other suitable support components, or a combination thereof. As described above, the shoulder anchor 102, the lap anchor 104, and the buckle anchor 106 are coupled or attached to respective brackets disposed on the rear side of the vehicle seat 110.

The bracket associated with the shoulder anchor 102 may be coupled or attached to a first support structure portion on a first rail, the bracket associated with the lap anchor 104 may be coupled or attached to a second support structure portion on a second rail, and the bracket associated with the buckle anchor 106 may be coupled or attached to a third support structure portion on the second rail.

In some embodiments, a cross member of the support structure is adapted to selectively couple and decouple the shoulder anchor 102 and the lap anchor 104. For example, the cross member may extend between the first support structure portion and the second support structure portion. The cross member may be disposed on the rear side of the vehicle seat 110 parallel or substantially parallel to the first axis A. The cross member may be adapted to engage and disengage one or both the first support structure portion and the second support structure portion. When the cross member engages the first support structure portion and the second support structure portion, the shoulder anchor 102 is coupled to the lap anchor 104. Conversely, when the cross member disengages at least one of the first support structure portion and the second support structure portion, the shoulder anchor 102 is decoupled from the lap anchor 104.

In some embodiments, at least one of the second support structure portion and the third support structure portion are adapted to selectively couple and decouple the lap anchor 104 and the buckle anchor 106. For example, the second rail may extend between the second support structure portion and the third support structure portion. The second rail may be disposed on the rear side of the vehicle seat 110 parallel or substantially parallel to the second axis B and or the third axis C. One or both of the second support structure and the third support structure may be adapted to engage and disengage a portion of the second rail. When the second support structure portion and the third support structure portion engage a portion of the second rail, the lap anchor 104 is coupled to the buckle anchor 106. Conversely, when at least one of the second support structure portion and the third support structure portion disengage from a portion of the second rail, the lap anchor 104 is decoupled from the buckle anchor 106.

When the shoulder anchor 102 is coupled to the lap anchor 104 and the lap anchor 104 is coupled to the buckle anchor 106, the shoulder anchor 102, the lap anchor 104, and the buckle anchor 106 are jointly positionable along the second axis B and the third axis C, respectively. For example, as the shoulder anchor 102 is selectively positioned along the second axis B, as described above, the lap anchor 104 and the buckle anchor 106 are jointly positioned along the third axis C. Additionally, or alternatively, as the lap anchor 104 is selectively positioned along the third axis C, as described above, the buckle anchor 106 is jointly positioned along the third axis C and the shoulder anchor 102 is jointly positioned along the second axis B. FIG. 1A generally illustrates the shoulder anchor 102 in a first position P1 along the second axis B, the lap anchor 104 in a first position P2 along the third axis C, and the buckle anchor 106 in a first position P3 along the third axis C. FIG. 1B generally illustrates the shoulder anchor 102, the lap anchor 104, and the buckle anchor 106 jointly translated a predetermined distance from the first positions P1, P2, and P3, respectively, to second positions P1', P2', and P3' respectively. The predetermined distance may include any suitable distance. For example, the second positions P1', P2', and P3' may be at a distance of 18 inches from the first positions P1, P2, and P3 such that the occupant may be secured at a different location on the vehicle seat 110.

When the shoulder anchor 102 is decoupled from the lap anchor 104, the shoulder anchor 102 is selectively positionable independently of the lap anchor 104 and the buckle anchor 106. For example, as described above, the shoulder anchor 102 is selectively positionable in either or both of the first and second directions along the second axis B. FIG. 1C generally illustrates the shoulder anchor 102 independently positioned from the first position P1 (generally illustrated in FIG. 1A) to the second position P1', while the lap anchor 104 is positioned in the first position P2 and the buckle anchor 106 is positioned in the first position P3.

Figure 1D:
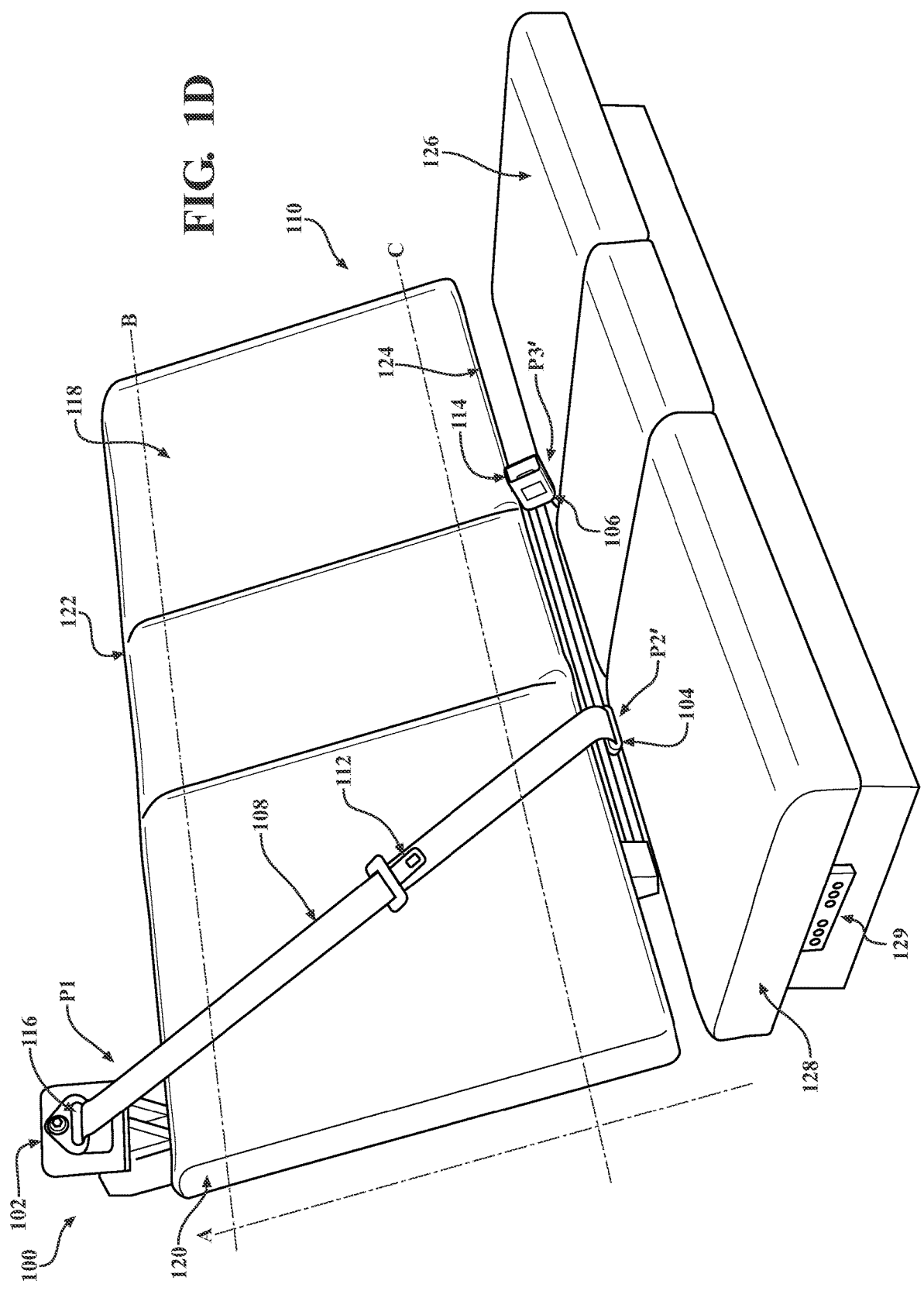

When the shoulder anchor 102 is decoupled from the lap anchor 104 and the lap anchor 104 is coupled to the buckle anchor 106, the lap anchor 104 and the buckle anchor 106 are jointly positionable independently of the shoulder anchor 102. For example, as described above, the lap anchor 104 and the buckle anchor 106 are selectively positionable in either or both of the first and second directions along the third axis C. FIG. 1D generally illustrates the lap anchor 104 and the buckle anchor 106 jointly positioned from the first positions P2 and P3, respectively, to the second position P2' and P3' along the third axis C, respectively. The lap anchor 104 and buckle anchor 106 are jointly positioned independently of the shoulder anchor 102, which is generally illustrated in the first position P1 in FIG. 1B.

When the lap anchor 104 is decoupled from the buckle anchor 106, the buckle anchor 106 is selectively positionable independently of the shoulder anchor 102 and the lap anchor 104. For example, a distance between the lap anchor 104 and the buckle anchor 106 is adjustable when the lap anchor 104 is decoupled from the buckle anchor 106. As described above, the buckle anchor 106 is selectively positionable in either or both of the first direction and the second direction along the third axis C. FIG. 1E generally illustrates the buckle anchor 106 positioned, independently of the shoulder anchor 102 and the lap anchor 104, from the first position P3 (generally illustrated in FIG. 1A) to the second position P3', while the shoulder anchor 102 and the lap anchor 104 are in the first positions P1 and P2, respectively.

When the shoulder anchor 102 is coupled to the lap anchor 104 and the lap anchor 104 is decoupled from the buckle anchor 106, the shoulder anchor 102 and the lap anchor 104 are jointly positionable along the second axis B and the third axis C, respectively, independently of the buckle anchor 106. For example, the shoulder anchor 102 and the lap anchor 104 may be positioned in either or both of the first and second directions along the second axis B and the third axis C, respectively, from positions along the second axis B and the third axis C, respectively, to other positions along the second axis B and the third axis C, respectively.

In some embodiments, when the shoulder anchor 102 is coupled to the lap anchor 104 and the lap anchor 104 is decoupled from the buckle anchor 106, the shoulder anchor 102 and the lap anchor 104 may be jointly positionable to a hidden position, as is generally illustrated in FIG. 1F. For example, the shoulder anchor 102 and the lap anchor 104 may be jointly positioned such that the safety belt strap 108 is disposed parallel or substantially parallel to the side 120 of the seat back 118. Additionally, or alternatively, the shoulder anchor 102 and the lap anchor 104 are selectively pivotable. For example, the shoulder anchor 102 may be pivotable about an attachment pin that couples or attaches the shoulder anchor 102 to the bracket, as described above, and the lap anchor 104 may be pivotable about an attachment pin that couples or attaches the lap anchor 104 to the bracket, as described above.

The shoulder anchor 102 and the lap anchor 104 may be pivotable between an operating position and a hidden position. When the shoulder anchor 102 and the lap anchor 104 are in the operating position, the shoulder anchor 102 and the lap anchor 104 face forward relative to the seat back 118, as is generally illustrated in FIGS. 1A-1E. When the shoulder anchor 102 and the lap anchor 104 are in the hidden position, as is generally illustrated in FIG. 1F, the shoulder anchor 102 and the lap anchor 104 may be pivoted such that the shoulder anchor 102 and the lap anchor 104 face away from the side 120 of the seat back 118. The shoulder anchor 102 and the lap anchor 104 may be positioned in the hidden position when the safety belt positioning system 100 is not in use by the occupant of the vehicle. Additionally, or alternatively, the safety belt positioning system 100 may be positioned in the hidden position to create an aesthetically pleasing appearance for the vehicle seat while the safety belt positioning system 100 is not in use by the occupant of the vehicle.

While only limited examples are illustrated, it should be understood that the shoulder anchor 102, the lap anchor 104, and the buckle anchor 106 are selectively positionable in positions other than those illustrated and/or described herein. The shoulder anchor 102, the lap anchor 104, and the buckle anchor 106 may be positioned along the first axis A, the second axis B, and the third axis C, respectively, to accommodate an occupant's particular posture, to accommodate an occupants seating position, to allow the occupant to reposition the safety belt strap 108 on the occupant's body to provide a more comfortable fit for the occupant while maintaining safety features of the safety belt strap 108, for other suitable reasons, or a combination thereof. For example, various occupants may have varying postures. The shoulder anchor 102 may be positioned along the second axis B to accommodate a posture of a particular occupant. In another example, an occupant may desire a more comfortable placement of the safety belt strap 108 on the occupant's body. The occupant may adjust a position of the lap anchor 104 and/or the buckle anchor 106 in order to position the safety belt strap 108 in a more comfortable position on the occupant's body.

In some embodiments, the shoulder anchor 102, the lap anchor 104, and the buckle anchor 106 may be positioned and/or pivoted by the occupant of the vehicle engaging and/or actuating one or more of the shoulder anchor 102, the lap anchor 104, and the buckle anchor 106. In some embodiments, the occupant of the vehicle may position and/or pivot one or more of the shoulder anchor 102, the lap anchor 104, and the buckle anchor 106 by actuating one or more switches of a plurality of switches 129 disposed within the vehicle, by interacting with an interface disposed within the vehicle, or a combination thereof. For example, the plurality of switches 129 may disposed on a side of the seat bottom 126, or any suitable location within the vehicle. The plurality of switches 129 may be in electrical communication with respective ones of the shoulder anchor 102, the lap anchor 104, and the buckle anchor 106. Actuating one or more switches of the plurality of switches 129 causes respective ones of the shoulder anchor 102, the lap anchor 104, and the buckle anchor 106 to be positioned or pivoted. In some embodiments, a control unit, as described in detail below, associated with the vehicle may selectively position the shoulder anchor 102, the lap anchor 104, and the buckle anchor 106 in response to input from the occupant of the vehicle, predefined positioning instructions, sensor data, or a combination thereof.

FIG. 2 generally illustrates a rear view of the safety belt positioning system 100 of FIGS. 1A-1F. As described above, the safety belt positioning system 100 may include a support structure disposed on a rear side of the vehicle seat 110. An example support structure 200, as is generally illustrated, may include a first rail 202 and a second rail 204. The first rail 202 may include features similar to those described above with respect to FIGS. 1A-1F and the second rail 204 may include features similar to those described above with respect to FIGS. 1A-1F. The shoulder anchor 102 may be coupled or attached to the first rail 202 by a bracket or bracket structure 206, the lap anchor 104 may be coupled or attached the second rail 204 by a bracket or bracket structure 208, and the buckle anchor 106 may be coupled or attached to the second rail 204 by a bracket or bracket structure 210.

In some embodiments, the support structure 200 includes a cross member 212. The cross member 212 is disposed parallel or substantially parallel to the first axis A and extends between the first rail 202 and the second rail 204.

The cross member 212 is adapted to couple and decouple the first rail 202 and the second rail 204. For example, the cross member 212 includes a first coupling member 214. The first coupling member 214 may be disposed parallel or substantially parallel to the cross member 212 and may be selectively positionable between a first position on the cross member 212 and a second position on the cross member 212. When the first coupling member 214 is in the first position on the cross member 212, the first coupling member 214 engages a portion of the first rail 202 and a portion of the second rail 204. When the first coupling member 214 is in the second position, the first coupling member 214 engages at most one of the first rail 202 and the second rail 204.

When the first coupling member 214 is in the first position (e.g., the first rail 202 is coupled to the second rail 204), the shoulder anchor 102 and the lap anchor 104 are coupled, as described above. When the first coupling member 214 is in the second position (e.g., the first rail 202 is decoupled from the second rail 204), the shoulder anchor 102 and the lap anchor 104 are decoupled, as described above. The cross member 212 may be selectively positioned along the first rail 202 and the second rail 204. When the first coupling member 214 is the in the first position, the cross member 212 may be moved or positioned along the first rail 202 and the second rail 204. As the cross member 212 is positioned along the first rail 202 and the second rail 204, the shoulder anchor 102 and the lap anchor 104 are jointly positioned along the second axis B and the third axis C, as described above. Conversely, when the first coupling member 214 is in the second position, as the cross member 212 is positioned along the first rail 202 and the second rail 204, the shoulder anchor 102 is positioned along the second axis B independently of the lap anchor 104, as described above.

In some embodiments, the support structure 200 includes a second coupling member 216 disposed parallel or substantially parallel to the second rail 204. The second coupling member 216 is adapted to couple and decouple the bracket structure 208 and the bracket structure 210. For example, when the second coupling member 216 is in a first position along the second rail 204, the bracket structure 208 is coupled to the bracket structure 210. When the bracket structure 208 is coupled to the bracket structure 210, the lap anchor 104 and the buckle anchor 106 are jointly positionable along the third axis C, jointly with or independently of the shoulder anchor 102, as described above.

When the second coupling member 216 is in a second position along the second rail 204, the bracket structure 208 is decoupled from the bracket structure 210. When the bracket structure 208 is decoupled from the bracket structure 210, the buckle anchor 106 is positionable along the third axis C independently of the lap anchor 104 and the shoulder anchor 102 and the lap anchor 104 is positionable along the third axis C independently of the buckle anchor 106 and the shoulder anchor 102. The support structure 200 may include additional, fewer, or different components than those described herein.

In some embodiments, one or both of the bracket structure 208 and the bracket structure 210 are adapted to engage and/or disengage a portion of the second rail 204. For example, the bracket structure 208 may engage a portion of the second rail 204 and the bracket structure 210 may disengage a portion of the second rail 204. When the bracket structure 208 engages a portion of the second rail 204 and the bracket structure 210 disengages a portion of the second rail 204, the lap anchor 104 is decoupled from the buckle anchor 106, and the buckle anchor 106 is positionable along the third axis C independently of the lap anchor 104 and the shoulder anchor 102. Additionally, or alternatively, when the bracket structure 208 disengages the second rail 204 and the bracket structure 210 engages the second rail 204, the lap anchor 104 is decoupled from the buckle anchor 106, and the lap anchor 104 is positionable along the third axis C independently of the buckle anchor 106 and the shoulder anchor 102.

Figure 3A:
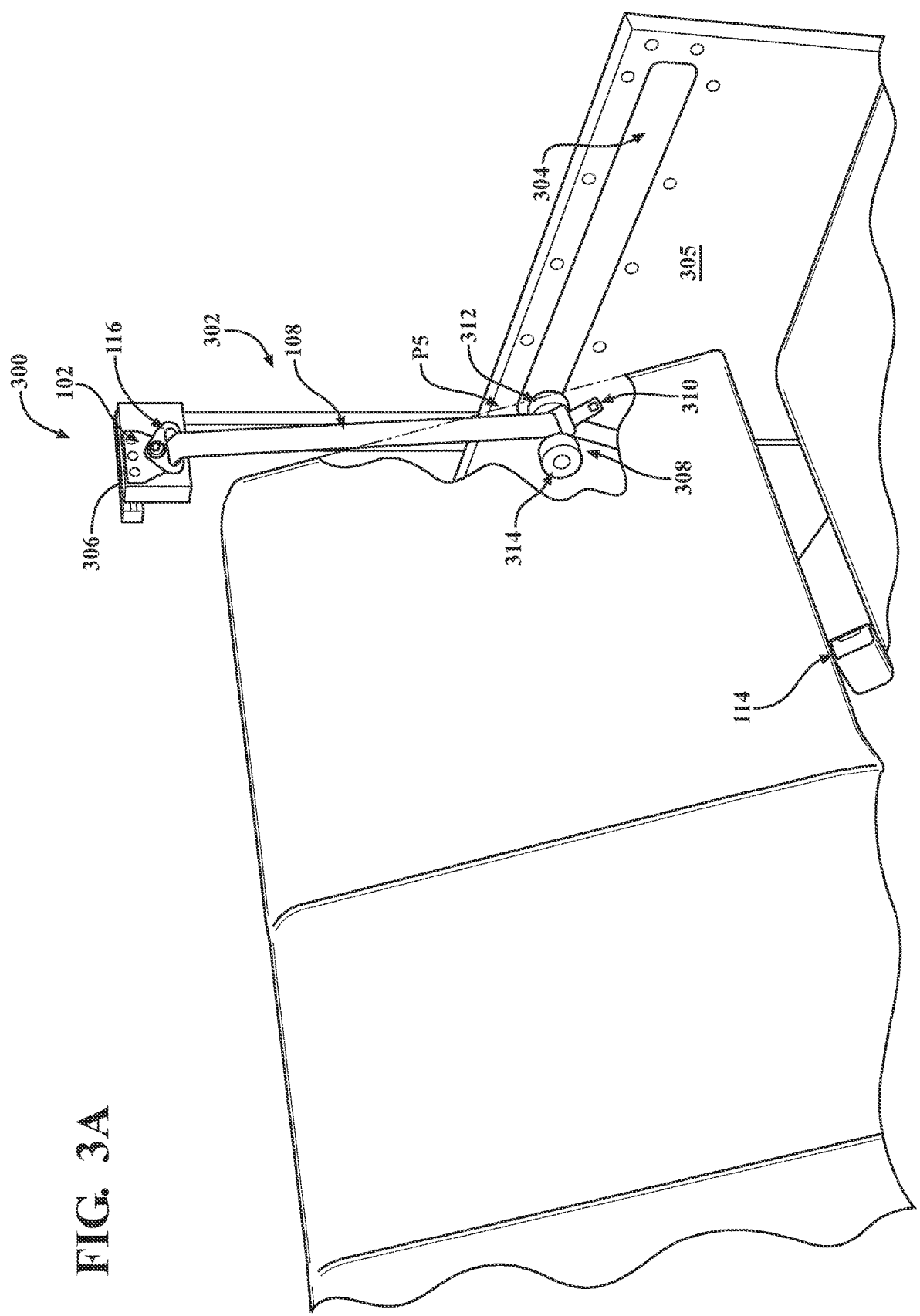
FIGS. 3A-3C generally illustrate a motion diagram of a safety belt presentation system according to the principles of the present disclosure.
Figure 3B:
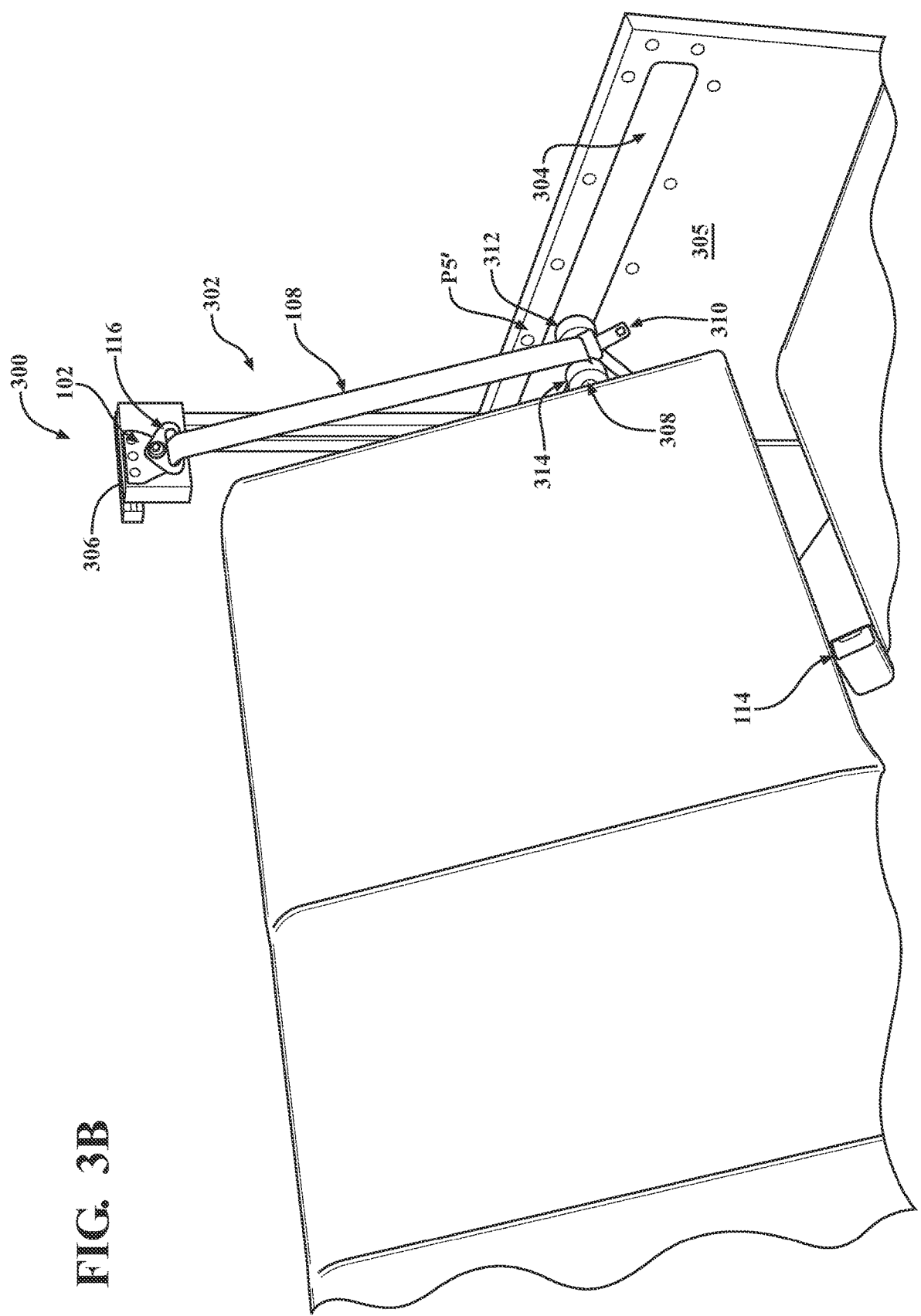
Figure 3C:
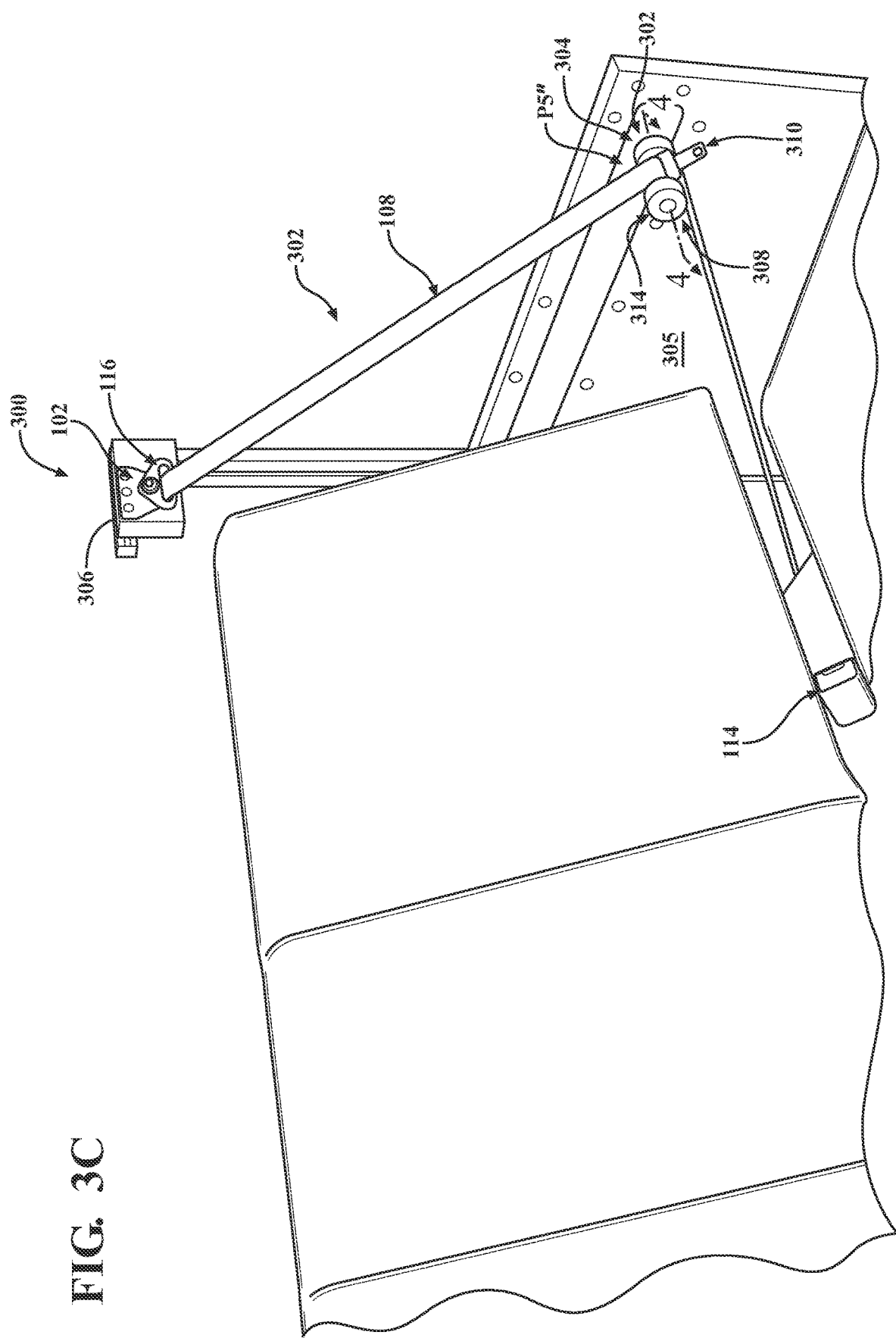

FIGS. 3A-3C generally illustrate a motion diagram of a safety belt presentation system 300 according to the principles of the present disclosure. The safety belt presentation system 300 may be disposed within a vehicle and is adapted to present a portion of a buckle, such as a latch, to an occupant of the vehicle for use in operating a safety belt within the vehicle. For example, the occupant may enter the vehicle and attempt to locate the latch for use in operating the safety belt. The latch may be lodged behind a portion of the vehicle seat and may be difficult to locate. The safety belt presentation system 300 may be utilized to allow the occupant of the vehicle to consistently and easily locate the latch for use in operating the safety belt. Additionally, or alternatively, the safety belt presentation system 300 may hide the latch when the occupant is no longer using the safety belt in order to provide for an aesthetically pleasing appearance to the vehicle seat when the safety belt is not in use by the occupant.

The safety belt presentation system 300 includes a safety belt system 302, a safety belt presentation track 304, and a control 306. The safety belt system 302 includes a shoulder anchor 102, a safety belt strap 108 (which may be referred to as a shoulder strap), and a buckle that includes a first buckle portion or a latch 308 and second buckle portion or a safety belt receiver 114.

The latch 308 is disposed on a portion of the safety belt strap 108. The latch 308 includes a tongue 310 that is adapted to be received and retained by the safety belt receiver 114. The tongue 310 is disposed between a first side 312 of the latch 308 and a second side 314 of the latch 308. In some embodiments, the first side 312 of the latch 308 is adapted to couple the latch 308 to a first side of the safety belt presentation track 304. The safety belt presentation track 304 may be disposed in a portion 305 of a vehicle door, a seat associated with the vehicle, an arm rest associated with the vehicle, or other suitable location within the vehicle.

The control 306 may include a motor or other suitable control device. The control 306 is adapted to selectively position the latch 308 along the safety belt presentation track 304. For example, the control 306 may receive instructions and/or be controlled by a control unit, as is described in detail herein. The control 306 may drive a driving mechanism, as is described in detail herein, disposed on a second side the safety belt presentation track 304. The driving mechanism may be adapted to engage at least a portion of the latch 308. As the control 306 drives the driving mechanism, the driving mechanism traverses at least a portion of the safety belt presentation track 304. As the driving mechanism traverses at least a portion of the safety belt presentation track 304, the latch 308, when coupled to the safety belt presentation track 304, may follow the driving mechanism such that the latch 308 is positioned from a hidden position P5, as is generally illustrated in FIG. 3A, to an intermediate position P5', as is generally illustrated in FIG. 3B. The latch 308 continues along the safety belt presentation track 304 to a presentation position P5", as is generally illustrated in FIG. 3C. As the latch 308 traverses the safety belt presentation track 304, a portion of the safety belt strap 108 is drawn out away from the shoulder anchor 102 through the aperture 116. The control 306 may position the latch 308 at suitable positions between the hidden position P5 and the presentation position P5" in response to instructions received from the control unit.

Figure 4:
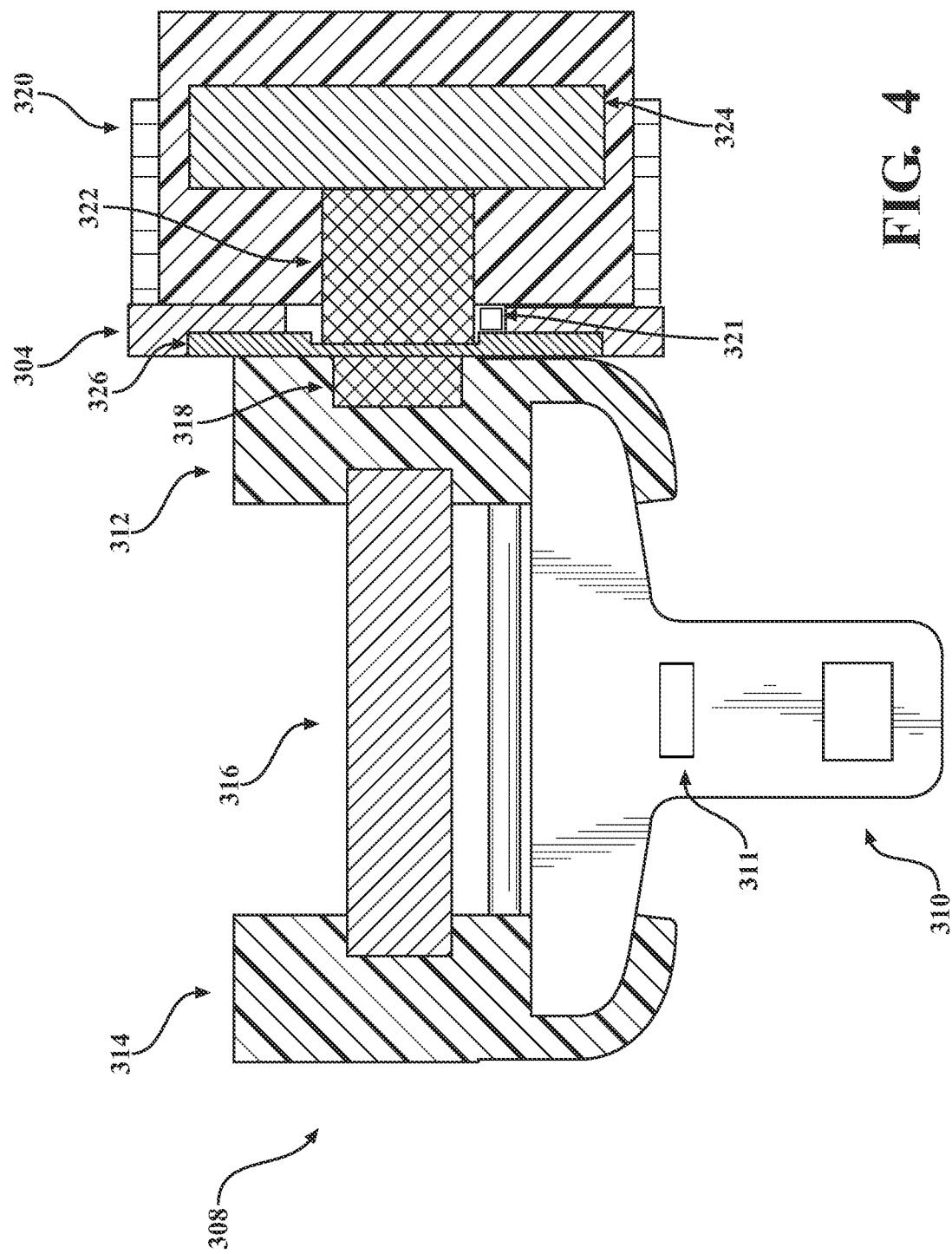
FIG. 4 generally illustrates a cross sectional view of a portion of the safety belt presentation system of FIGS. 3A-3C.

FIG. 4 generally illustrates a cross sectional view of a portion of the safety belt presentation system 300 of FIGS. 3A-3C according to the principles of the present disclosure. The portion of the safety belt presentation system 300 includes the latch 308, the tongue 310, the first side 312 of the latch 308, and the second side 314 of the latch 308. In some embodiments, the latch 308 includes a strap control mechanism 316. The strap control mechanism 316 may include a low friction rod or member disposed between the first side 312 of the latch 308 and the second side 314 of the latch 308. The strap control mechanism 316 is adapted to control and/or guide movement of a portion of the safety belt strap 108 as the latch 308 traverses the safety belt presentation track 304 and/or as the latch 308 is drawn toward or away from the safety belt receiver 114.

The first side 312 of the latch 308 includes a first coupling portion 318. The first coupling portion 318 may be enclosed by the first side 312 of the latch 308 or a portion of the first coupling portion 318 may be exposed on an exterior of the first side 312 of the latch 308. The first coupling portion 318 may include any suitable coupling portion, for example, the first coupling portion 318 may include a magnet having a first magnetic pole, an iron member, a steel member, or a combination thereof. The first coupling portion 318 is adapted to engage a portion of the first side of the safety belt presentation track 304.

A driving mechanism 320 is disposed on the second side of the safety belt presentation track 304 and includes a second coupling portion 322. The second coupling portion 322 is adapted to engage the first coupling portion 318 such that the latch 308 engages the first side of the safety belt presentation track 304 and is coupled to the second coupling portion 322. The second coupling portion 322 may include any suitable coupling portion, for example, the second coupling portion 322 may include a magnet having a second magnetic pole that is opposite the first magnetic pole of the first coupling portion 318, an iron member, a steel member, or a combination thereof. The driving mechanism 320 may include a retaining portion 324. The retaining portion 324 is adapted to retain at least a portion of the second coupling portion 322. For example, when the second coupling portion 322 includes a magnet, the retaining portion 324 may include an iron member. The second coupling portion 322 is magnetically attracted to and retained on the retaining portion 324.

In some embodiments, a first magnetic value of the first coupling portion 318 and a second magnetic value of the second coupling portion 322 may be selected to provide a desirable retention and/or release of the latch 308 to and from the safety belt presentation track 304. For example, the first magnetic value and the second magnetic value may be selected such that as the latch 308 transitions between the hidden position P5 and the presentation position P5", a force applied on the latch 308 by the safety belt strap 108 does not cause the first coupling portion 318 to disengage from the second coupling portion 322. Additionally, or alternatively, the first magnetic value and the second magnetic value may be selected such that when the occupant retrieves the latch 308 when the latch 308 is in the presentation position P5", the occupant can remove the latch 308 from the safety belt presentation track 304 with a desired amount of force (e.g., the first coupling portion 318 can be disengaged from the second coupling portion 322 with the desired amount of force).

The driving mechanism 320 is in electrical communication with a control, such as, the control 306, described with respect to FIGS. 3A-3C. The control 306 may provide electrical and/or mechanical power to the driving mechanism 320. The driving mechanism 320 traverses the safety belt presentation track 304 using the power provided by the control 306. As described above, the control 306 may drive the driving mechanism 320 in response to instructions received from the control unit. For example, the control unit may determine whether to present the latch 308 to the occupant of the vehicle. The control unit may monitor sensors associated with a vehicle door, weight sensors in a vehicle seat associated with the safety belt presentation system 300, or other suitable sensors and/or information, or a combination thereof. The control unit, based on signals received from the monitored sensors and/or other information, instructs the control 306 to present the latch 308 to the occupant (e.g., by transitioning the latch 308 from the hidden position P5 to the presentation position P5").

The occupant may then disengage the latch 308 from the first side of the safety belt presentation track 304 in order to insert the latch 308 into the safety belt receiver 114. The control unit may then instruct the control 306 to return the driving mechanism 320 to the hidden position. For example, the driving mechanism 320 includes one or more sensors 321. The one or more sensors 321 may be adapted to sense whether the first coupling portion 318 is coupled to the second coupling portion 322. The control unit may receive one or more signals from the one or more sensors 321. The control unit may determine whether the first coupling portion 318 is disengaged or decoupled from the second coupling portion 322 based on the one or more signals. When the control unit determines that the first coupling portion 318 is disengaged or decoupled from the second coupling portion 322, the control unit instructs the control 306 to return the driving mechanism 320 to the hidden position.

In some embodiments, the control unit may selectively release the latch 308 from the safety belt presentation track 304 in response to the occupant touching the tongue 310 of the latch 308. For example, the tongue 310 may include one or more sensors 311. The sensors 311 may include capacitance sensors, touch sensors, other suitable sensors, or a combination thereof. The one or more sensors 311 may be adapted to sense when an occupant of the vehicle touches the tongue 310 while the first coupling portion 318 is engaged by the second coupling portion 322. The one or more sensors 311 may send signals to the control unit that indicate whether the occupant is touching the tongue 310. The control unit may instruct a release component of the driving mechanism 320 to disengage or decouple the first coupling portion 318 from the second coupling portion 322. The release component may include a component that retracts the second coupling portion 322 away from the first coupling portion 318 such that a magnetic force between the first coupling portion 318 and the second coupling portion 322 is reduced until the first coupling portion 318 is disengaged or decoupled from the second coupling portion 322. As a result, the latch 308 may be released from the safety belt presentation track 304.

When the occupant removes the safety belt strap 108, the occupant may release the latch 308 from the safety belt receiver 114. The latch 308 may be retracted by a force applied on the latch 308 by the safety belt strap 108. The first coupling portion 318 may be engaged by the second coupling portion 322 as the latch 308 is retracted to a location near the second coupling portion 322. The latch 308 may be coupled to the second coupling portion 322 and returned to the hidden position P5.

In some embodiments, the safety belt presentation track 304 includes a low friction component 326 disposed on the first side of the safety belt presentation track 304. For example, as is illustrated in FIG. 4, the low friction component 326 is disposed on a portion of the first side of the safety belt presentation track 304 such that the latch 308 traverses the safety belt presentation track 304 along the low friction component 326. This may provide for a smooth (e.g., due to a relatively low surface friction of the low friction component 326) transition from the hidden position P5 to the presentation position P5". The low friction component 326 may comprise polytetrafluoroethylene (PTFE), other suitable low friction materials, or a combination thereof.

Figure 5:
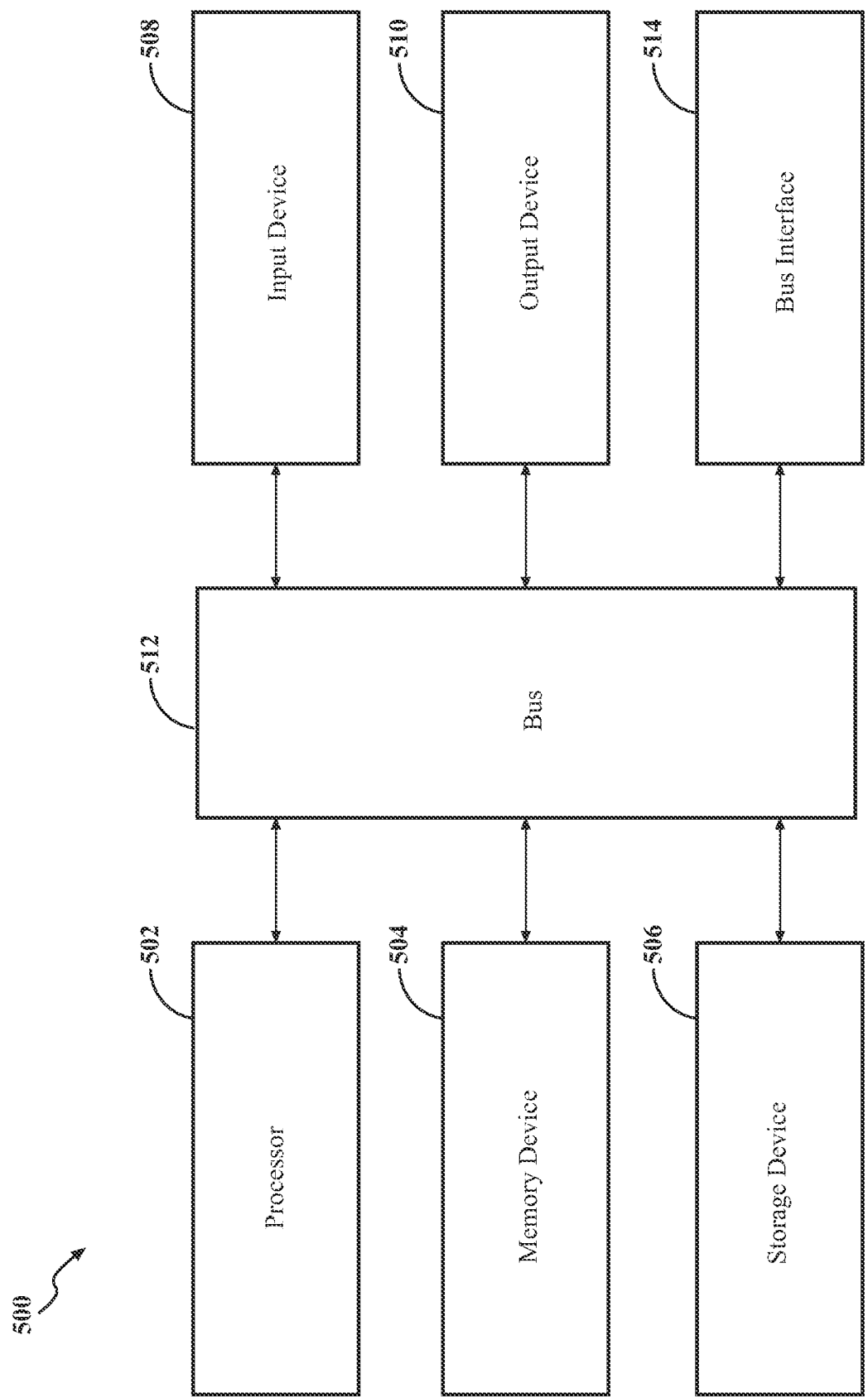
FIG. 5 is a block diagram of an example of a computing device.

FIG. 5 is a block diagram of an example of a computing device 500. The computing device 500 can be a single computing device or a system that includes multiple computing devices working cooperatively. As an example, the computing device 500 can be a vehicle-based computing device such a control unit or a vehicle ECU. Alternatively, the computing device 500 can be a desktop computer, a laptop computer, a tablet, or a mobile device such as a smart phone.

In the example where the computing device 500 is a control unit, the control unit can be operable to send commands to various components of the safety belt positioning and presentation systems in the above-described embodiments. For example, the control unit can send commands to anchors, support structures, controls, driving mechanisms, etc. in order to cause positioning of the anchors and/or presentation of a portion of a safety belt buckle. That is, the control unit can send commands to implement various safety belt positioning and/or presentation systems described herein.

In the illustrated example of FIG. 5, the computing device 500 includes a processor 502, a memory device 504, a storage device 506, one or more input devices 508, and one or more output devices 510 which are interconnected by a bus 512. The computing device 500 can also include a bus interface 514 for connecting peripheral devices to the bus 512.

The processor 502 can be any type of device that is able to process or manipulate information, including devices that are currently known and devices that may be developed in the future. As an example, the processor 502 can be a conventional central processing unit (CPU). Although the illustrated example shows a single processor, multiple processors can be used instead of a single processor.

The memory device 504 can be used to store information for immediate use by the processor 502. The memory device 504 includes either or both of a random-access memory (RAM) device and a read only memory (ROM) device. The memory device 504 can be used to store information, such as program instructions that can be executed by the processor 502, and data that is stored by and retrieved by the processor 502. In addition, portions of the operating system of the computing device 500 and other applications that are being executed by the computing device 500 can be stored by the memory device during operation of the computing device 500.

The storage device 506 can be used to store large amounts of data persistently. As examples, the storage device 506 can be a hard disk drive or a solid-state drive.

The input devices 508 can include any type of device that is operable to generate computer interpretable signals or data in response to user interaction with the computing device 500, such as physical interaction, verbal interaction, or non-contacting gestural interaction. As examples, the input devices 508 can include one or more of a keyboard, a mouse, a touch-sensitive panel with or without an associated display, a trackball, a stylus, a microphone, a camera, or a three-dimensional motion capture device.

The output devices 510 can include any type of device that is able to relay information in a manner that can be perceived by a user. As examples, the output devices 510 can include one or more of an LCD display screen, an LED display screen, a CRT display screen, a printer, an audio output device such as a speaker, or a haptic output device. In some implementations, the output devices 510 include a display screen and the input devices 508 include a touch sensitive panel that is integrated into the display screen to define a touch-sensitive display screen.

The bus 512 transfers signals and/or data between the components of the computing device 500. Although depicted as a single bus, it should be understood that multiple or varying types of buses can be used to interconnect the components of the computing device 500. The bus interface 514 can be any type of device that allows other devices, whether internal or external, to connect to the bus 512. In one implementation, the bus interface 514 allows connection to a controller area network (CAN) bus of a vehicle.

What is claimed is:

1. A method, comprising:
   receiving information identifying presence of an occupant;
   in response to receiving the information identifying presence of the occupant, controlling a track coupling portion and a latch releasably coupled to the track coupling portion to traverse a safety belt presentation track in a first direction;
   receiving information identifying that the latch is decoupled from the track coupling portion; and
   in response to receiving the information identifying that the latch is decoupled, controlling the track coupling portion to traverse the safety belt presentation track in a second direction opposite the first direction.

2. The method of claim 1, wherein controlling the track coupling portion includes moving the track coupling portion between a first position and a second position spaced from the first position along the safety belt presentation track.

3. The method of claim 1, wherein the information identifying the presence of the occupant is received from a sensor associated with a vehicle that includes the safety belt presentation track.

4. The method of claim 3, wherein the information identifying that the latch is decoupled from the track coupling portion is received from a sensor associated with the safety belt presentation track.

5. The method of claim 1, wherein the latch includes a latch coupling portion on a side of the latch, and wherein the latch coupling portion is configured to engage the track coupling portion.

6. The method of claim 5, further comprising:
   controlling a release component to retract the track coupling portion away from the latch coupling portion such that a magnetic force between the track coupling portion and the latch coupling portion is reduced until the latch coupling portion is disengaged from the track coupling portion.

7. The method of claim 1, wherein the latch includes a sensor configured to identify contact with the latch by the occupant, the method further comprising:
   controlling the track coupling portion to release the latch coupling portion in response to receiving a signal indicative of contact with the latch from the sensor.

8. The method of claim 1, wherein the safety belt presentation track is disposed in one of a vehicle door, a vehicle seat, and a vehicle arm rest.

9. A method, comprising:
   presenting a latch of a safety belt to an occupant at a first position on a safety belt presentation track, wherein the latch includes a latch coupling portion releasably coupled to a track coupling portion of the safety belt presentation track;

controlling the track coupling portion to release the latch coupling portion in response to receiving a signal indicative of contact with the latch; and controlling the track coupling portion to traverse the safety belt presentation track by moving from the first position to a second position spaced from the first position in response to receiving a signal indicative of the latch coupling portion being decoupled from the track coupling portion.

10. The method of claim 9, wherein the signal indicative of contact with the latch is based on information received from a sensor associated with the latch that is configured to identify contact with the latch.

11. The method of claim 10, wherein the sensor associated with the latch is disposed on a tongue of the latch.

12. The method of claim 9, wherein the signal indicative of the latch coupling portion being decoupled from the track coupling portion is based on information received from a sensor associated with the safety belt presentation track.

13. The method of claim 9, wherein the latch coupling portion is disposed on a side of the latch.

14. The method of claim 13, further comprising:

controlling a release component to retract the track coupling portion away from the latch coupling portion such that a magnetic force between the track coupling portion and the latch coupling portion is reduced until the latch coupling portion is disengaged from the track coupling portion.

15. The method of claim 9, further comprising:

receiving information identifying presence of the occupant, wherein the presenting the latch of the safety belt to the occupant occurs in response to receiving the information identifying the presence of the occupant.

16. A method, comprising:

moving a track coupling portion and a latch of a safety belt releasably coupled to the track coupling portion from a first position to a second position spaced from the first position along a safety belt presentation track;

receiving information identifying that the latch is decoupled from the track coupling portion; and in response to receiving the information identifying that the latch is decoupled, moving the track coupling portion from the second position to the first position.

17. The method of claim 16, further comprising:

in response to receiving information indicative of contact with the latch, controlling a release component to retract the track coupling portion away from the latch coupling portion until the latch coupling portion is decoupled from the track coupling portion.

18. The method of claim 17, wherein the information indicative of contact with the latch is received from a sensor disposed on a tongue of the latch.

19. The method of claim 16, wherein the information identifying that the latch is decoupled is received from a sensor associated with the safety belt presentation track.

20. The method of claim 16, wherein the safety belt presentation track is disposed in one of a vehicle door, a vehicle seat, and a vehicle arm rest.

* * * * *